(12) United States Patent
Julian et al.

(10) Patent No.: US 8,014,277 B2
(45) Date of Patent: Sep. 6, 2011

(54) RESTRICTING TIME SLOTS FOR MESH NETWORKS

(75) Inventors: David Jonathan Julian, San Diego, CA (US); Avneesh Agrawal, San Diego, CA (US); Ashwin Sampath, San Diego, CA (US); Gavin Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1297 days.

(21) Appl. No.: 11/560,092

(22) Filed: Nov. 15, 2006

(65) Prior Publication Data

US 2007/0171819 A1  Jul. 26, 2007

Related U.S. Application Data

(60) Provisional application No. 60/737,731, filed on Nov. 16, 2005.

(51) Int. Cl.
*H04J 1/16* (2006.01)
(52) U.S. Cl. ..................................................... 370/229
(58) Field of Classification Search .................. 370/229, 370/230, 230.1, 235, 338, 333, 323, 329, 370/342–348, 419–420; 455/441, 522, 411
See application file for complete search history.

(56) References Cited

U.S. PATENT DOCUMENTS

| | | | | |
|---|---|---|---|---|
| 6,940,824 B2 * | 9/2005 | Shibutani | ....................... | 370/252 |
| 7,239,637 B2 * | 7/2007 | Umayabashi | ............... | 370/395.3 |
| 7,480,264 B1 * | 1/2009 | Duo et al. | ................... | 370/310.2 |
| 7,633,909 B1 * | 12/2009 | Jones et al. | .................... | 370/338 |
| 7,653,410 B2 * | 1/2010 | Itsuki | .......................... | 455/550.1 |
| 2002/0061009 A1 | 5/2002 | Sorenson | | |
| 2002/0067736 A1 | 6/2002 | Garcia-Luna-Aceves et al. | | |
| 2003/0108059 A1 | 6/2003 | Yew et al. | | |

FOREIGN PATENT DOCUMENTS

| | | |
|---|---|---|
| JP | 2005094529 A | 4/2005 |
| WO | 9937106 | 7/1999 |
| WO | 03019798 | 3/2003 |

OTHER PUBLICATIONS

International Search Report—PCT/US06/061006—International Search Authority—European Patent Office—Nov. 9, 2007.
Taiwanese Search Report—095142517—TIPO—Apr. 14, 2010 (date at the very bottom of document).
Written Opinion—PCT/US06/061006, International Search Authority, European Patent Office, Nov. 9, 2007.

\* cited by examiner

*Primary Examiner* — Chi Pham
*Assistant Examiner* — Alexander Boakye
(74) *Attorney, Agent, or Firm* — Nicholas J. Pauley; Peter M. Kamarchik; Jonathan T. Velasco

(57) ABSTRACT

Systems and methods are described that facilitate controlling transmission/reception time slots in a wireless multi-hop ad hoc network. A node, such as an access terminal or an access point, may select an identifier that corresponds to specific time slots during which nodes with that particular identifier may transmit and/or receive. Nodes that are one hop away from each other may select different identifiers in order to ensure that neighboring nodes do not transmit and/or receive during the same time slots. In this manner, interference caused and/or experienced by a given node may be reduced.

4 Claims, 10 Drawing Sheets

RESTRICTING TIME SLOTS FOR MESH NETWORKS

CROSS-REFERENCE

This application claims the benefit of U.S. Provisional Application Ser. No. 60/737,731, entitled "RESTRICTING TIME SLOTS FOR MESH NETWORKS," filed on Nov. 16, 2005, the entirety of which is incorporated herein by reference.

BACKGROUND

I. Field

The following description relates generally to wireless communications, and more particularly to managing transmission and reception in a wireless communication environment.

II. Background

Wireless communication devices have become smaller and more powerful in order to meet consumer needs and to improve portability and convenience. The increase in processing power in mobile devices such as cellular telephones has led to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform portions of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information. For example, at any given time t, a user is provided access to the channel for a short burst. Then, access switches to another user who is provided with a short burst of time for transmitting and receiving information. The users alternate transmitting and receiving, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band portion of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Accordingly, a need in the art exists for systems and/or methods that facilitate coordination of transmit and receive schedules to improve throughput in a wireless communication environment.

SUMMARY

The following presents a simplified summary of one or more aspect in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, nodes (e.g., access terminals, access points, etc.) in a multi-hop ad hoc network may select identifiers that indicate time slots during which a given node may transmit and/or receive communications. For example, nodes that are one hop away from each other may select different identifiers to ensure that they transmit during different time slots and thereby reduce interference.

According to related aspects, a method for data communications can comprise detecting a set of at least one node and choosing a node from the detected set. The chosen node has an identifier associated with it. The method may further comprise selecting an identifier from a set of at least two identifiers and processing data based on at least one of the selected identifier and the identifier of the chosen node.

Another aspect relates to an apparatus for data communications. The apparatus may comprise a means for detecting a set of at least one node. The apparatus may also comprise a means for choosing a node from the detected set. The chosen node may have an associated identifier. The apparatus may further comprise a means for selecting an identifier from a set of at least two identifiers and a means for processing data based on the selected identifier, the identifier of the chosen node, or both the selected identifier and the identifier of the chosen mode.

Yet another aspect relates to an apparatus for data communications that may comprise a detecting module that may be configured to detect a set that comprises at least one node and a choosing module that may be configured to choose a node from the detected set. An identifier may be associated with the chosen node. The apparatus may further comprise a selecting module that may be configured to select an identifier from a set of at least two identifiers and a processing module that may be configured to process data based on either or both the selected identifier and the identifier of the chosen node.

Still another aspect relates to a processor that may be configured to detect a set that includes at least one node and choose a node that has an identifier associated therewith from the detected set. The processor may be further configured to select an identifier from a set of at least two identifiers and process data based on at least one of the selected identifier and the identifier of the chosen node.

According to another aspect is a computer program product for data communications. The computer program product may comprise a computer-readable medium comprising codes for causing a computer to detect a set of at least one node, choose a node, which has an identifier associated with it, from the detected set, select an identifier from a set of at least two identifiers, and process data based on the selected identifier, the identifier of the chosen node, or both the selected identifier and the identifier of the chosen node. A computer program product may include a storage medium such as a compact disc (CD) with software thereon. The software may comprise instructions or codes. The computer program product may also comprise the CD and its associated packaging.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles may be employed and the described aspects are intended to include all such aspects and their equivalents.

DETAILED DESCRIPTION

Figure 1:
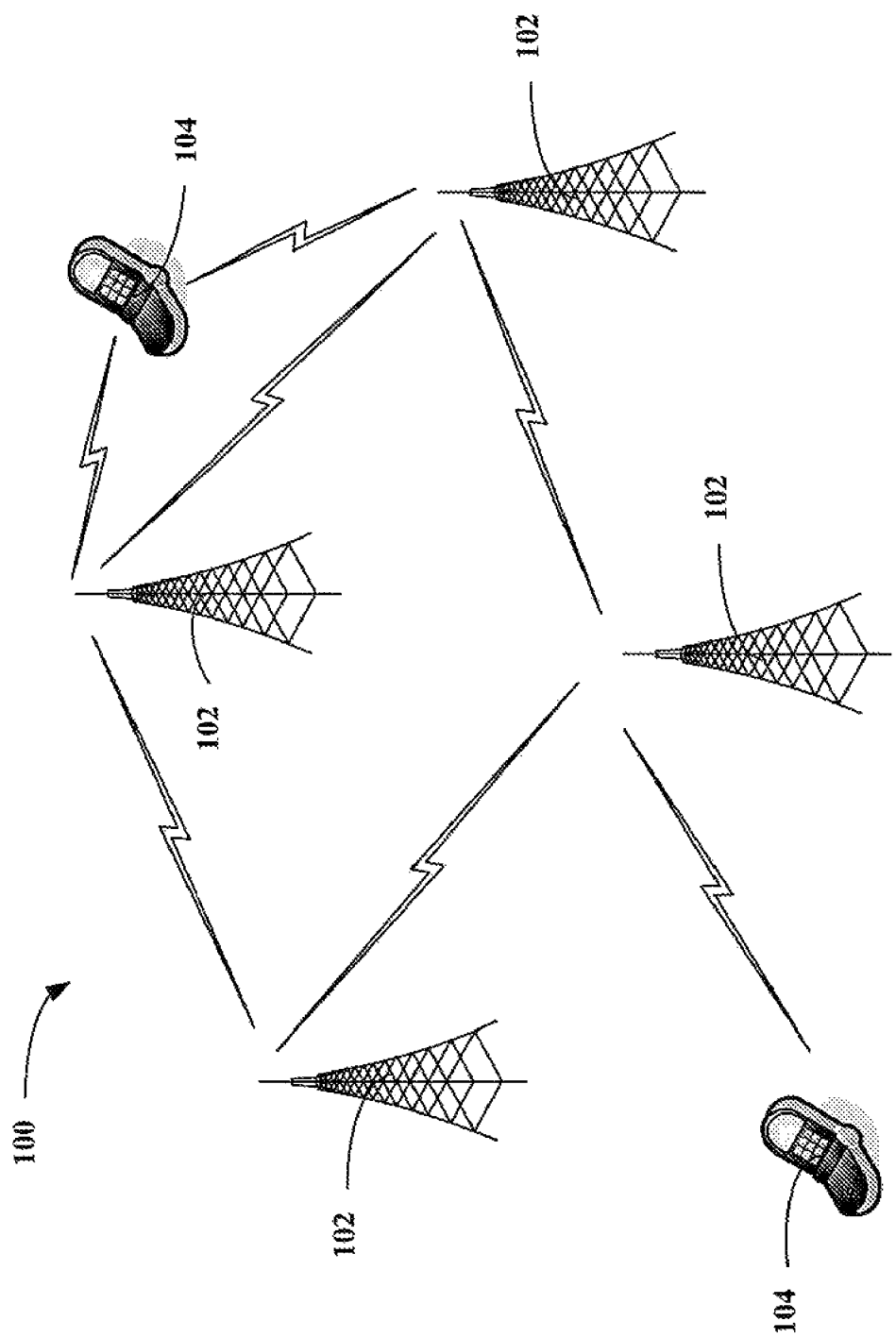
FIG. 1 is an illustration of an ad hoc, or mesh, wireless communication environment, in accordance with various aspects.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any aspect or design described herein as "exemplary" is not necessarily to be construed as preferred or advantageous over other aspects or designs.

FIG. 1 is an illustration of an ad hoc, or random, wireless communication environment or system 100, in accordance with various aspects. System 100 may comprise one or more access points 102, which may be fixed, mobile, radio, Wi-Fi, etc., in one or more sectors that receive, transmit, repeat, etc., wireless communication signals to each other and/or to one or more access terminals 104. Each access point 102 may comprise a transmitter chain and a receiver chain, each of which may in turn comprise a plurality of components associated with signal transmission and reception (e.g., processors, modulators, multiplexers, demodulators, demultiplexers, antennas, etc.), as will be appreciated by one skilled in the art. Access terminals 104 may be, for example, cellular phones, smart phones, laptops, personal computers, handheld communication devices, handheld computing devices, satellite radios, global positioning systems, personal digital assistants (PDAs), wireless modem card and/or any other suitable device for communicating over wireless network 100. System 100 can be employed in conjunction with various aspects described herein in order facilitate providing scalable resource reuse in a wireless communication environment, as set forth with regard to subsequent figures.

Access terminals 104 are typically dispersed throughout the system 100, and each terminal 104 may be fixed or mobile. Each terminal 104 may communicate with zero, one, or multiple access points 102 on the downlink and uplink at any given moment. The downlink (or forward link) refers to the communication link from the access points 102 to the terminals 104, and the uplink (or reverse link) refers to the communication link from the terminals 104 to the base stations 102.

For a centralized architecture, a system controller (not shown) may couple to access points 102 and provide coordination and control for access points 102. For a distributed architecture, access points 102 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
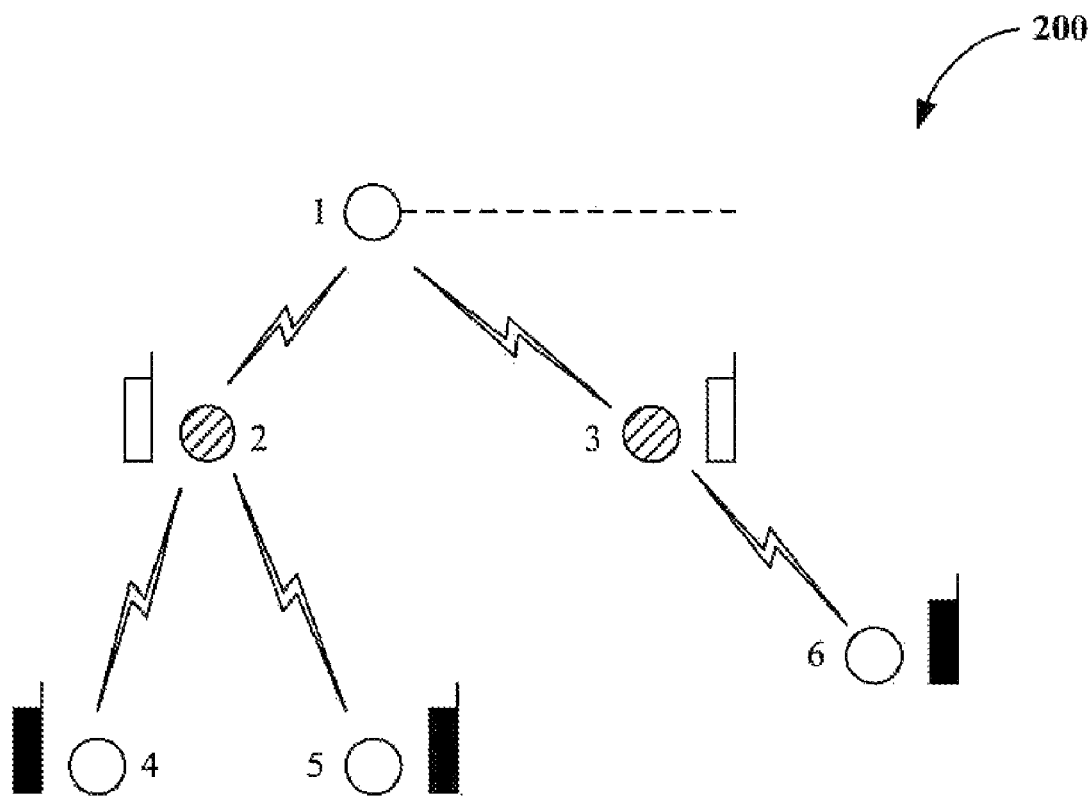
FIGS. 2 and 3 illustrate a multi-hop ad hoc network and data transmission scheme, wherein data flows primarily between access points wired to the Internet or a local network, and the rest of the nodes, in accordance with one or more aspects.
Figure 3:
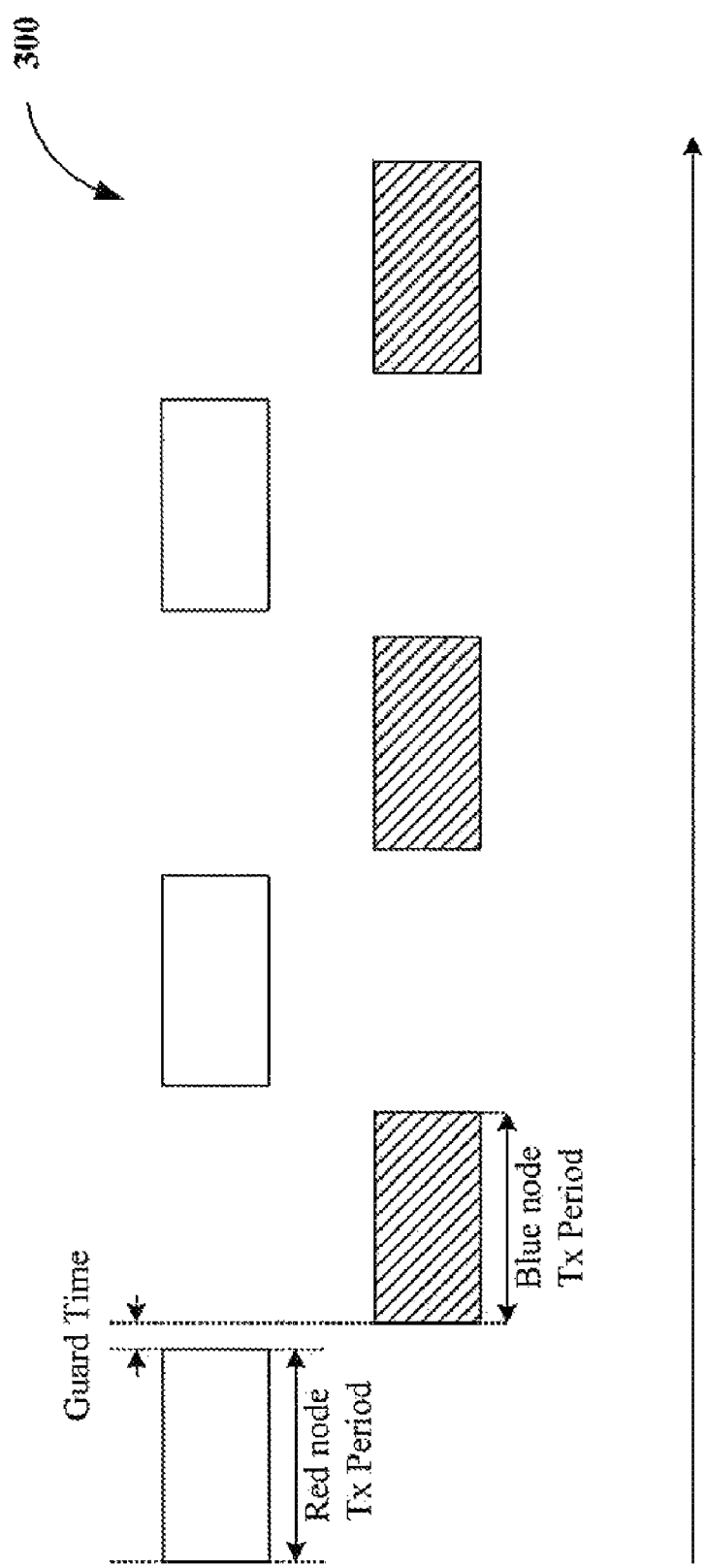

FIGS. 2 and 3 illustrate a multi-hop ad hoc network 200 and data transmission scheme 300, wherein data flows primarily between access points wired to the Internet or a local network, and the rest of the nodes, in accordance with one or more aspects. A hop refers to a particular segment or leg of a communication path between a sender and a recipient or two nodes that are operatively coupled such as nodes 1 and 2 in FIG. 2. Although FIGS. 2 and 3 are described with regard to assigning "colors" to nodes and corresponding transmission time slots, it is to be appreciated that any suitable unique and/or distinguishable designators (also referred to as identifiers or indicators) may be utilized. For example, integer values, binary values, names, etc., may be utilized to distinguish proximate nodes and/or time slots from one another. According to the figures, each node is colored one of two colors, such as red and blue. For purposes of illustration in FIGS. 2 and 3, "red" areas are indicated by an absence of hashes and "blue" is depicted with a rightward hash. Thus, node 1 in FIG. 2 is a red node, as are nodes 4, 5, and 6, while nodes 2 and 3 are indicated as blue nodes (e.g., by the rightward hashes). A red node (e.g., node 1, 4, 5, and/or 6 of FIG. 2) may only transmit during red slots, while a blue node (e.g., node 2 and/or 3 of FIG. 2) may only transmit during blue slots, as shown in FIG. 3.

The wired access point (e.g., node 1) selects an arbitrary color, such as red. Such selection can be made by the wired access point based on the disclosed techniques, randomly, probabilistically, or based on other criteria. All nodes that are one hop from the wired access point (e.g., nodes 2 and 3) may select the opposite color, blue. All nodes that are two hops away (e.g., nodes 4, 5, and 6) may select red, and so forth. In general, each node selects the opposite color of its parent node, where the parent node is the first node on the routing path back to the wired access point. This creates a topology where, for any given node, all the nodes that are one hop away select an opposite color. Thus, a node need not transmit and receive simultaneously.

According to related aspects, more than two "colors" may be utilized to distinguish nodes. For instance, the color of a child node may be the next ordered color from the parent node in a modulo relationship. Additionally, mobile nodes may be assigned a third color, which separates access from backhaul. Still furthermore, control channel segment may be separated from data transmissions, and only the control channels need be "colored."

Selection of the wired access point color and the routing paths can be used to determine individual node colors, which can be chosen to manage interference from simultaneous transmissions. For example, if two nodes interfere with each other when one transmits and the other receives, then their colors can be selected through parent node color selection or wired access point color selection, such that either they are the same color or they are connected. Additionally or alternatively, each color may be further divided into two or more sub-colors. If a node detects an active dominant interferer, then it may send an indication to the dominant interference node, which restricts the node to only transmit on the sub-colors (e.g., time slots having the sub-colors). For example, the sub-color for blue may correspond to even blue slots, or odd blue slots, or every fourth blue slot, etc. Further, if the dominant interferer is not detected in a given period of time, or a subsequent indication is not received in a given period of time, then the node on a sub-color may either move back to the full color, or to a less restrictive sub-color. In this manner, the various described aspects facilitate scheduling transmissions without contention periods and mitigating a need for simultaneous transmission and reception.

Figure 4:
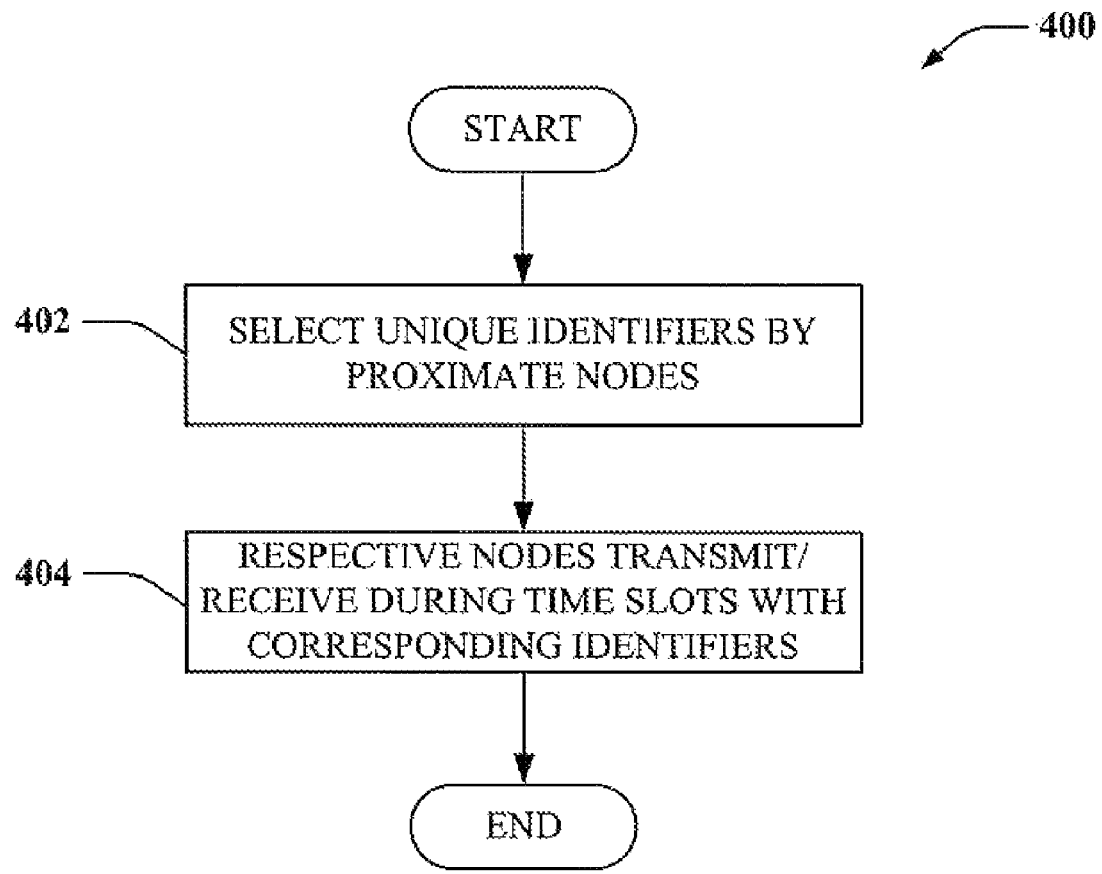
FIG. 4 illustrates a method for controlling transmission time slots to mitigate interference in a mesh network, in accordance with one or more aspects.
Figure 5:
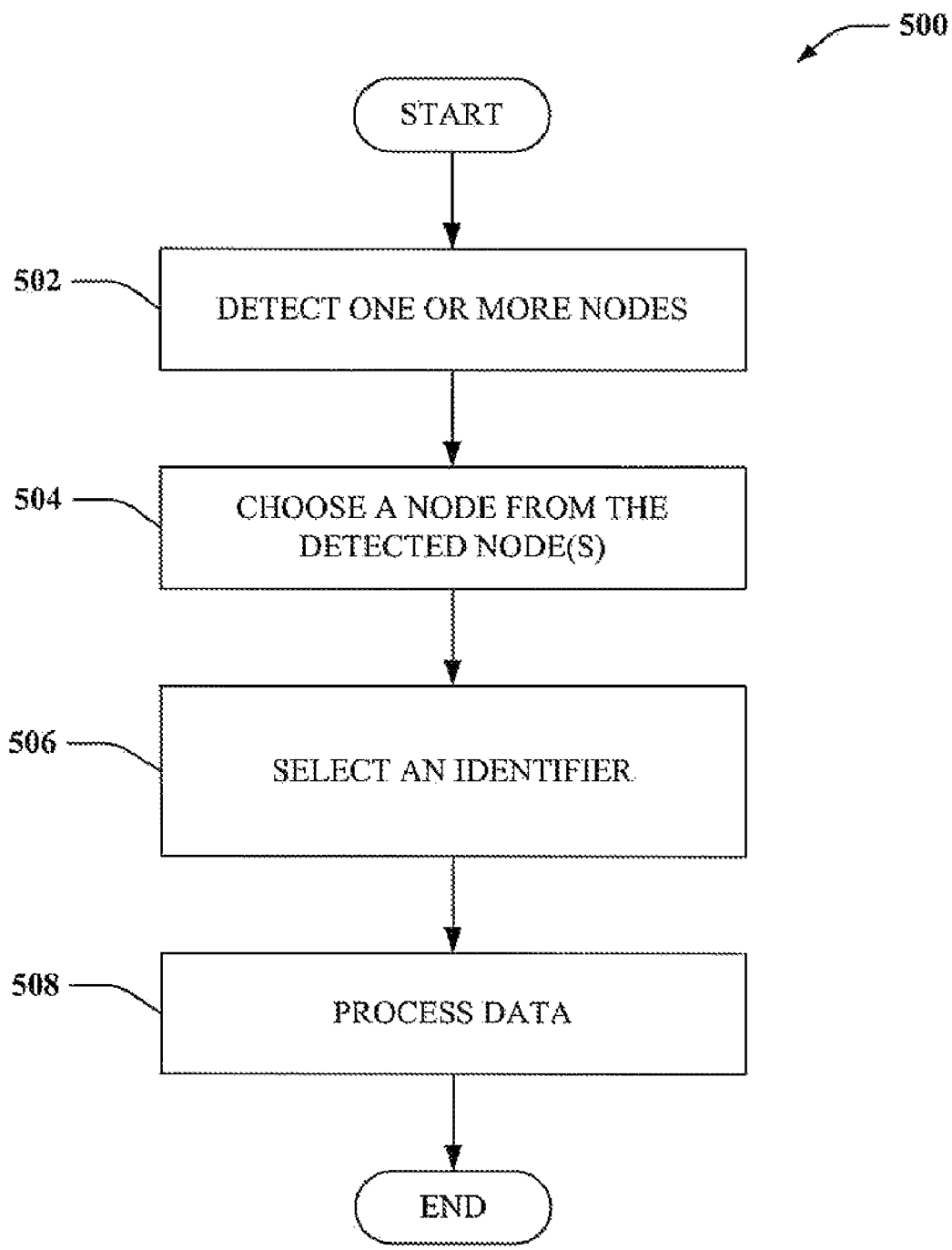
FIG. 5 is an illustration of a method for data communication by selecting an identifier at an access node and permitting the node to communicate during timeslots associated with respective identifiers, in accordance with one or more aspects.
Figure 6:
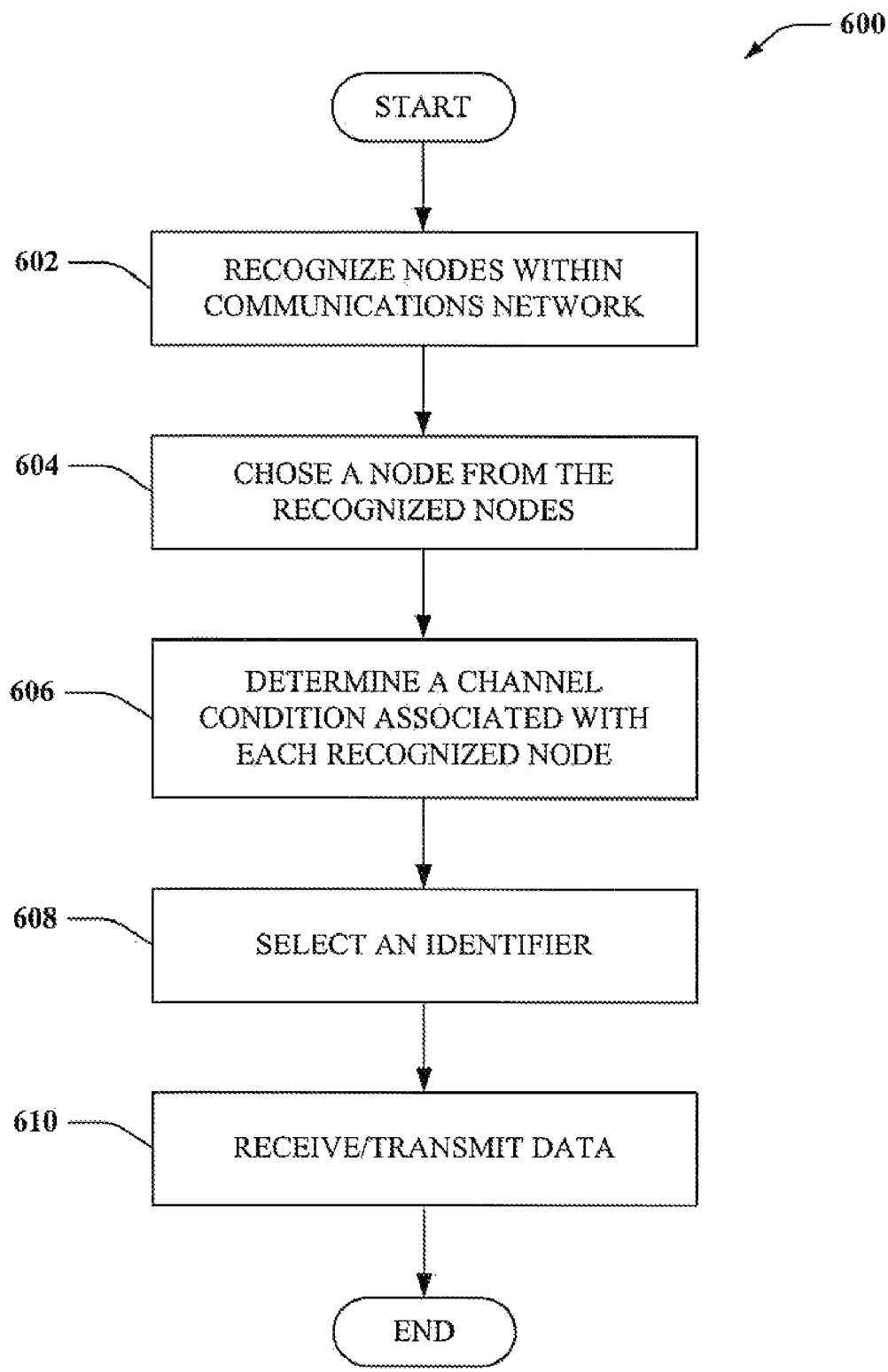
FIG. 6 is an illustration of a method for controlling transmit and receive schedules for nodes in a time-division duplexing multi-hop mesh network, in accordance with one or more aspects described herein.

Referring to FIGS. 4-6, methods relating to coordinating transmit times and receive times in a wireless mesh network are illustrated. For example, methods can relate to data communication time slots in a wireless mesh network in an FDMA environment, an OFDMA environment, a CDMA environment, a WCDMA environment, a TDMA environment, an SDMA environment, or any other suitable wireless environment. While, for purposes of simplicity of explanation, the methods are shown and described as a series of acts, it is to be understood and appreciated that the methods are not limited by the order of acts, as some acts may, in accordance with one or more aspects, occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with one or more aspects.

FIG. 4 illustrates a method 400 for coordinating transmit times and receive times in a mesh network, in accordance with one or more aspects. At 402, indicators may be selected by nodes in a region of the network. For instance, a first node may be a wireless access point, a wired access point, or the like, and may select an indicator value. According to an example, in a case where two indicators are used to distinguish nodes in a routing topology, a first indicator may be selected by the first node, and a child node (e.g., an access terminal, another access point, . . . ) in the topology may have selected a second indicator. Nodes that are two hops away from each other may select the same indicator value according to a two-indicator example. For instance, a grandchild node of the parent node may have the same indicator value as the parent node.

At 404, nodes may transmit or receive signals during time slots corresponding to their respective indicator values. For instance, nodes having a first indicator may transmit/receive during time slots reserved for nodes with first indicator, while nodes with a second indicator may transmit/receive during time slots reserved for nodes with the second indicator value. If greater interference diversity is desired, more indicator values may be employed.

FIG. 5 is an illustration of a method 500 for data communication by selecting an identifier at an access node and permitting the node to communicate data (e.g., transmit and receive) during timeslots associated with respective identifiers, in accordance with one or more aspects. The access node may be a wired access point, a wireless access point, an access terminal, or another communication device. At 502, a communication network in which the access node is employed is evaluated and one or more nodes (e.g., wired access point, wireless access point, access terminal, and so forth) are detected within the environment. Such detection can occur when the access node enters the network, upon power up, or at various intervals. At 504, a node is chosen from the set of one or more nodes. Choosing the node may comprise recognizing or determining an identifier associated with each node detected, at 502, and choosing the node based on its determined identifier. Thus, the choice might not be based on the quality of the link or other data but based on having a different identifier.

At 506, an identifier is selected from a set that includes two or more identifiers. The selected identifier may be different from the identifier of the chosen node. The two or more identifiers may comprise the identifier of the chosen node and the selected identifier. In accordance with some aspects, the selection can be based on the transmit power of the access node, the quality of service associated with the access node, or both the transmit power and the quality of service. For example, if the node will be utilized for a voice call, the selection might be based on the most reliable link so that the voice call has a lower chance of being dropped. If the node will be utilized for surfing the web, the selection might be based on criteria other than the most reliable link such as the link that can achieve the highest throughput. Alternatively or additionally, the selection can be based on an amount of interference detected within the communication network, the amount of traffic or communication occurring during each time slot, the number of nodes that can communicate during that time slot, and so on.

For example, the selection may take into consideration that the transmit power of an access point might be stronger than the transmit power of an access terminal. Thus, an access terminal, given a choice between a first identifier associated with an access point and a second identifier associated with an access terminal, might choose the second identifier so that it does not have to transmit during the same time slot as the access point. In another example, if the access node has a strong transmit power, it might be able to tolerate more interference than a node that has a weaker transmit power. Thus, the access node might not take into consideration the amount of interference it will cause to other nodes when choosing the identifier.

Alternatively or additionally, the set of two or more identifiers may comprise a first identifier to be selected only by an access terminal and a second identifier to be selected by either an access terminal or access point. Thus, the access terminal can select either of the two identifiers while the access point only has one choice. The set may also comprise a third identifier to be selected only by an access point, thus providing the access point with two choices. Therefore, the selection may be based on the type of node (e.g., access point, access terminal).

At 508, data is processed (e.g., transmitted, received) based on the selected identifier, the identifier of the chosen node, or both the selected identifier and the identifier of the chosen node. For example, data is communicated during time slots that correspond to the indicator or identifier selected by the access node. For instance, nodes assigned a first indicator may transmit/receive during time slots associated with the first indicator, and nodes assigned a second indicator may transmit/receive during time slots associated with the second indicator, and so on through N indicators (if desired), where N is an integer.

According to some aspects, indicators may be selected as a function of one or more factors, such as geographical distance from a proximate node, geographical distance from a wired access node, access point, or first parent node (e.g., which may be an access point, an access terminal, a repeater station, etc.) and the like. Additionally or alternatively, selection of a particular indicator may be a function of transmit power and distance to proximate nodes (e.g., a likelihood that the node to which the indicator is being assigned will cause interference at one or more proximate nodes).

FIG. 6 is an illustration of a method 600 for controlling transmit and receive schedules for nodes in a time-division duplexing multi-hop mesh network, in accordance with one or more aspects described herein. At 602, one or more nodes within a communication environment are recognized or detected by an access node. Such recognition can occur when the access node enters the communication environment, when other access nodes enter the environment or at other times. For example, there can be five nodes recognized, three having a first color, one having a second color, and one having a third color. Although "color" is used herein as an identifier, it will be appreciated by those skilled in the art that any suitable identifiers (e.g., numbers, letters, frequencies, binary values, positive/negative designators, and so forth) may be utilized to distinguish nodes from one another.

At 604, a node having an identifier associated with it is chosen from the detected set. The chosen node can be an access point (wired or wireless), an access terminal, or other communication device. The node can be chosen based on various criteria including the identifier, a transmit power of the node, a transmit power of the access node, and so forth. A channel condition associated with each detected node may be determined or evaluated, at 606. For example, upon entering a mesh network three nodes are detected. For each link between the access node and the three nodes, the channel condition is determined and the link having the best channel condition is chosen. Alternatively or additionally, the determination may be made based on an interference associated with each detected node. The interference determination may be based on identifiers of the detected nodes. For example, five nodes are detected wherein three nodes are associated with a blue color, one with a red color, and one with a green color. A blue color may not be selected because there are potentially at least three other nodes transmitting during the blue time slot. Thus, the determination may be made based on how many nodes have a common color or other identifier.

At 608, an identifier is selected from a set of two or more identifiers. The set can include the identifier of the chosen node and the selected identifier. Alternatively or additionally, the selection can be made based on the channel condition determination, on the interference determination, or on both the channel condition determination and the interference determination. For example, if a red and a green node are adjacent to the access node the selection may be made based on those color choices.

If the access node is a wired access point, it can randomly select an identifier from the set of at least two identifiers. Additionally or alternatively, the wired access point can make the selection based on probabilistic criteria or based on other criteria. However, if the access node is not a wired access point, it should not select randomly to mitigate the occurrence of nodes that have a distance of one hop being assigned the same identifier.

For instance, if the access point randomly or otherwise selects the color red, then nodes one hop away from the access point may select the color blue. Remaining nodes may select colors such that neighboring nodes are not assigned the same color. According to the above example, nodes that are two hops away from the access point node may select the color red, while nodes that are three hops away may select blue. In this example, nodes that are an odd number of hops from the access point may select the second color, while nodes that are an even number of hops away from the access point may select the color of the access point. In this manner, no two neighboring nodes will have the same color.

At 610, nodes may process (e.g., receive or transmit) data during time slots assigned to the respective colors. That is to say, that transmitting or receiving data may be based on the selected identifier, the identifier of the chosen node, or both. Data reception can include receiving data during time slots associated with the selected identifier and data transmission can include transmitting data during time slots associated with the identifier of the chosen node. The transmitted and/or received data can be control data, payload data, or other data. Therefore, the identifier can be used for transmitting/receiving control data on a control channel or for other data (e.g., voice data, payload data, and so forth).

For instance, blue nodes may transmit during blue time slots and red nodes may transmit during red time slots, where differently colored time slots are distinct in time and do not overlap. By permitting transmission only during a correspondingly colored time slot, neighboring nodes do not transmit at the same time, thus mitigating interference there between. Thus, method 600 facilitates controlling transmit and receive times for nodes in a TDD multi-hop mesh network.

Figure 7:
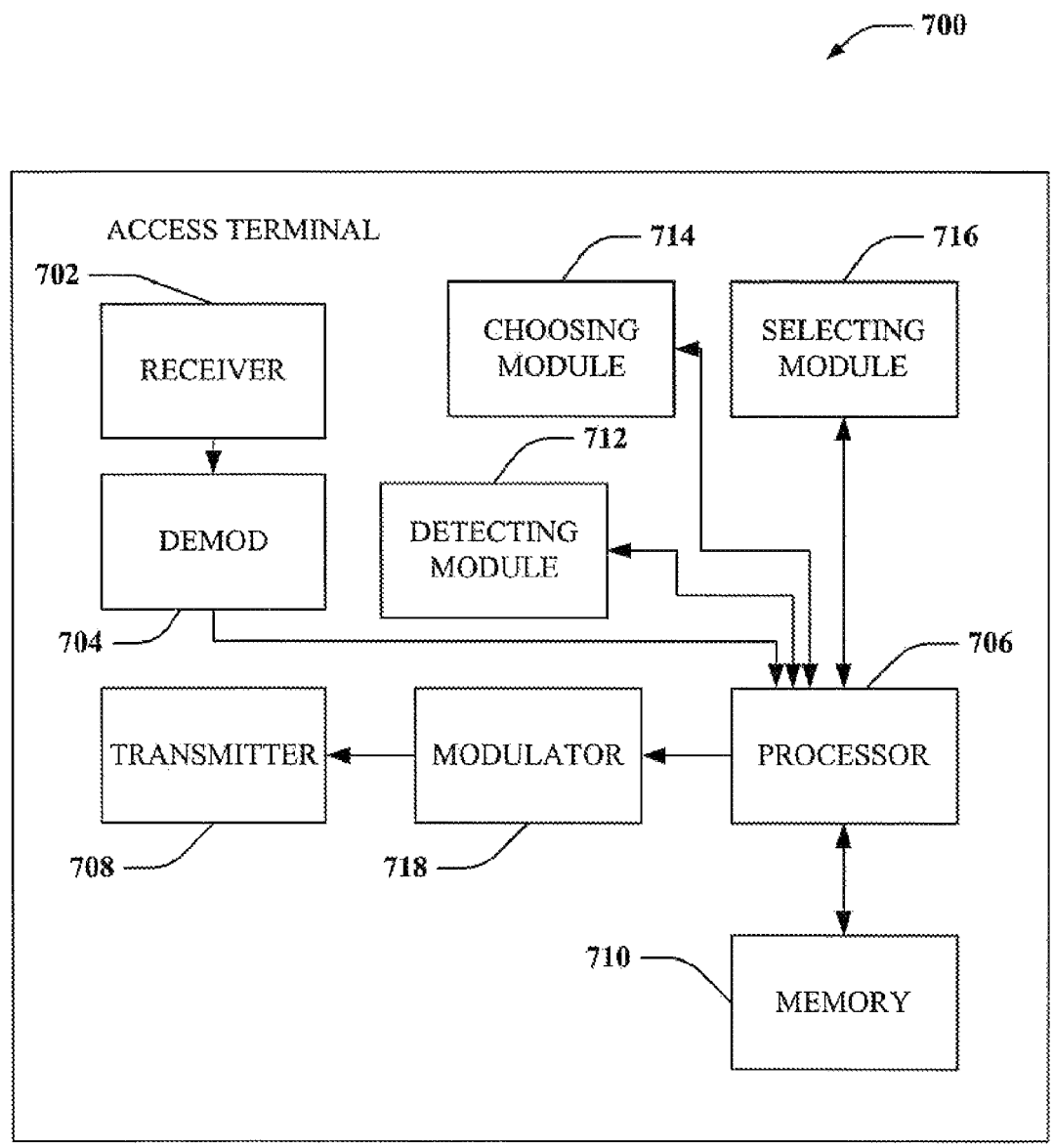
FIG. 7 is an illustration of an access terminal that facilitates controlling transmission time slots in a mesh network, in accordance with one or more aspects.

FIG. 7 is an illustration of an access terminal 700 that facilitates selecting and controlling transmission and reception time slots in a mesh network, in accordance with one or more aspects. Access terminal 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be operatively associated with a demodulator 704 that demodulates received signals and provides them to a processor 706 for channel estimation. Processor 706 may be a processor dedicated to analyzing information received by receiver 702 and/or generating information for transmission by a transmitter 708, a processor that controls one or more components of access terminal 700, and/or a processor that both analyzes information received by receiver 702, generates information for transmission by transmitter 708, and controls one or more components of access terminal 700. Additionally, processor 706 may execute instructions for detecting an indicator assignment, comparing an assigned indicator (e.g., a color, number, bit value, . . . ) to a time slot indicators to determine which time slots may be utilized for transmission, for selecting an indicator as a function of indicators associated with proximate nodes, etc.

Access terminal 700 can additionally comprise memory 710 that is operatively coupled to processor 706 and that may store data to be transmitted, received data, and the like. Memory 710 may store information related to indicator assignments, indicator selections, indicators associated with other proximate or neighboring nodes, etc. For example, information related to indicators assigned to a nearest N nodes, where N is an integer, may be stored for analysis upon entry into a sector or cell, upon wake up, etc., in order to permit access terminal 700 to make a selection of an indicator (e.g., that is different from the proximate nodes' indicators) for itself that will minimize interference between itself and neighboring nodes.

It will be appreciated that the data store (e.g., memory 710) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 710 of the subject systems and methods is intended to comprise, without being limited to, these and any other suitable types of memory.

Receiver 702 is further operatively coupled to a detecting module 712 that may be configured to detect one or more nodes within a communications network. Such detection can occur when access terminal 700 enters the network, for example. A choosing module 714 can be operatively coupled to the receiver 702 and/or detecting module 712. Choosing module 714 may be configured to choose a node from the one or more detected nodes. An identifier can be associated with the chosen node that indicates the corresponding time slot during which the chosen node transmits and/or receives data.

A selecting module 716 may be operatively connected to a processor and can be configured to select an identifier from a set of at least two identifiers. The processor 706 can further be configured to process data based on one or more of the selected identifier and the identifier of the chosen node. Additionally or alternatively, detecting module 712 may detect other nodes' indicator assignments in order to permit processor 706 to evaluate indicators for proximate nodes and select an indicator for access terminal 700 as a function thereof. For instance, processor 706 may select an indicator that is different from indicators assigned to or selected by nearby, or proximate, nodes. Transmitter 708 may then transmit (and receiver 702 may receive) during time slots associated with the selected or assigned indicator. Because the selected or assigned indicator is different from indicators of proximate nodes, access terminal 700 is permitted to transmit/receive on different time slots than those upon which proximate nodes may transmit/receive, thereby mitigating interference between access terminal 700 and proximate nodes.

Access terminal 700 still further comprises a modulator 718 and a transmitter 708 that transmits the signal to, for instance, a base station, an access point, another access terminal, a remote agent, etc. Although depicted as being separate from the processor 706, it is to be appreciated that one or more of detecting module 712, choosing module 714, and selecting module 716 may be part of processor 706 or a number of processors (not shown).

Figure 8:
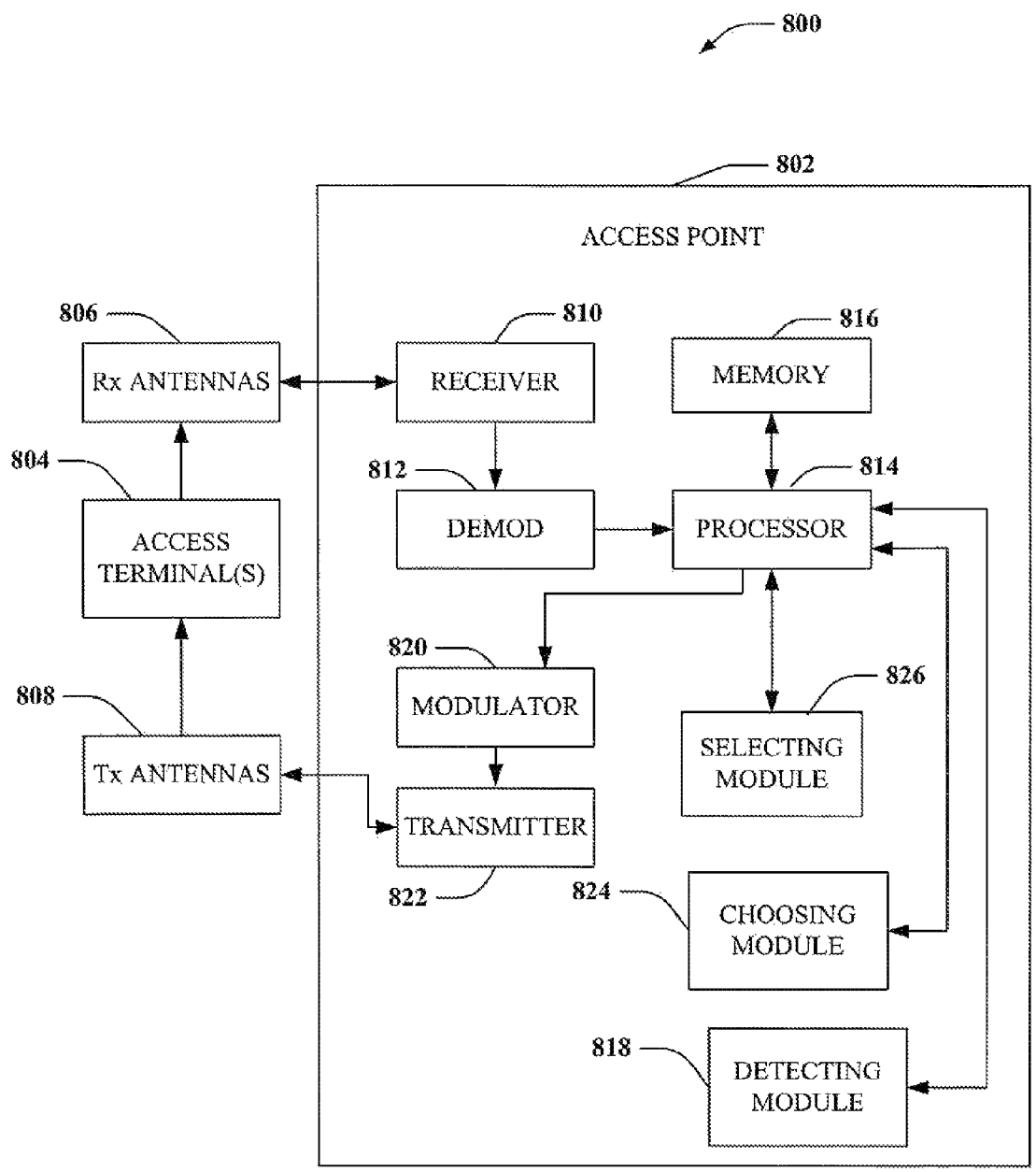
FIG. 8 is an illustration of a system that facilitates providing transmission time slot control using indicators that identify which nodes may transmit during which time slots, in accordance with one or more aspects.

FIG. 8 is an illustration of a system 800 that facilitates providing transmission and reception time slot control using indicators that identify which nodes may transmit/receive during which time slots, in accordance with one or more aspects. System 800 comprises an access point 802 with a receiver 810 that receives signal(s) from one or more access terminals 804 through a plurality of receive antennas 806, and a transmitter 822 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that may be similar to the processor described above with regard to FIG. 7, and which is coupled to a memory 816 that stores information related to indicator assignments for access point and/or proximate nodes, indicator selection protocols, transmission/reception protocols for transmitting/receiving on time slots associated with a selected or assigned indicator, and/or any other suitable information related to performing the various actions and functions set forth herein.

Processor 814 may be further coupled to a detecting module 818, a choosing module 824, and a selecting module 826, which together may facilitate selecting an indicator associated with access point 802. Processor 814 may execute instructions similar to those described above with regard to processor 706. For example, selecting module 826 may select an assignment of an indicator (e.g., a color, number, letter, bit value, . . . ) to access point, and processor 814 may direct transmitter 822 to transmit (and receiver 810 to receive) only during time slots associated with the assigned indicator. According to another aspect, detecting module 818 may detect indicators associated with other nodes (e.g., access terminals, access points, repeaters, . . . ) proximate to the access point 802 and processor 814 may select an indicator that is different from the detected indicators to ensure that transmitter 822 does not transmit (and receiver 810 does not receive) during time slots that are reserved for the proximate nodes via their respective indicators. Although depicted as being separate from processor 814, it is to be appreciated that detecting module 818, choosing module 824, selecting module 826 may be part of processor 814 or a number of processors (not shown).

Figure 9:
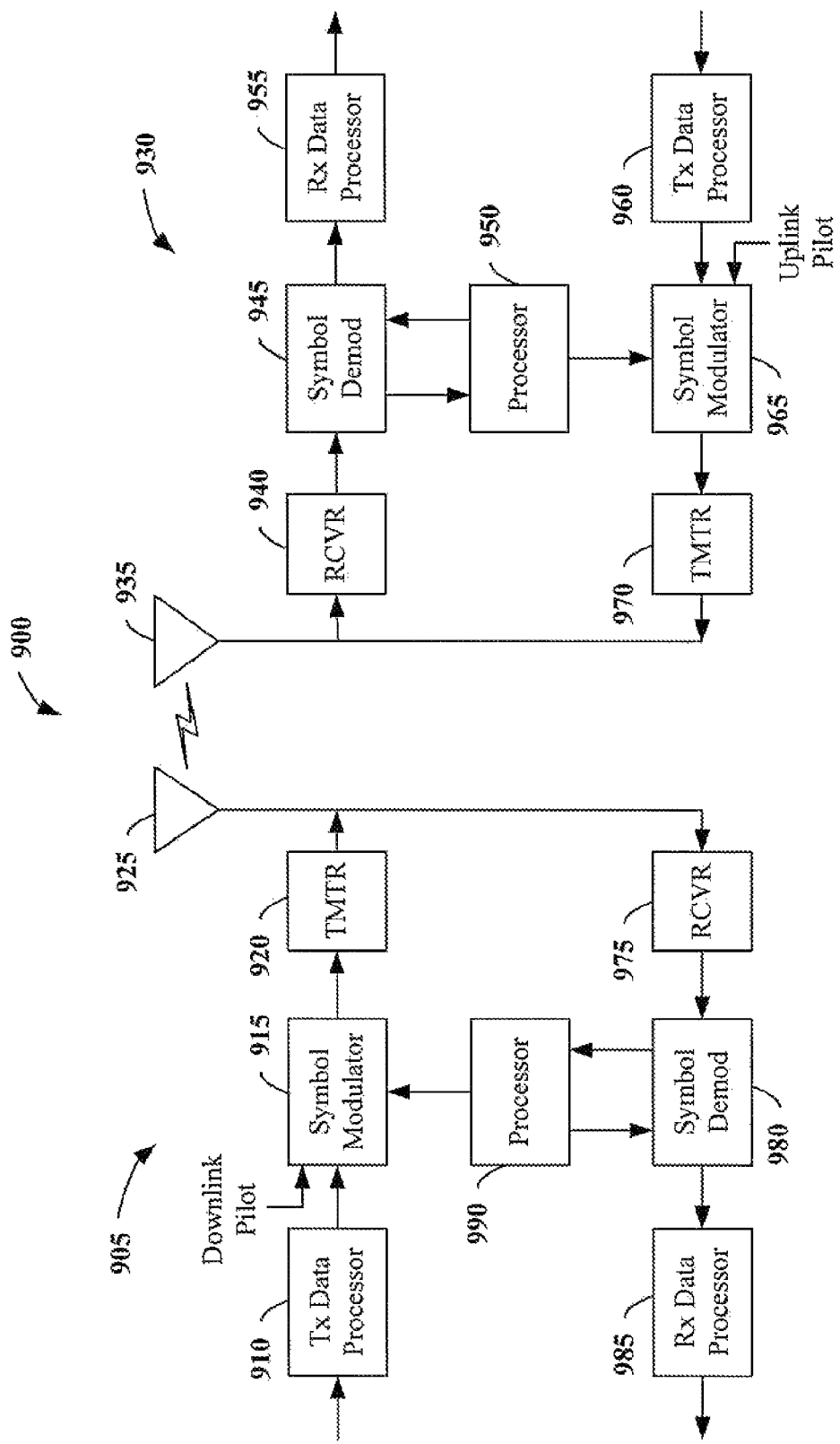
FIG. 9 is an illustration of a wireless network environment that can be employed in conjunction with the various systems and methods described herein.

FIG. 9 shows an exemplary wireless communication system 900. The wireless communication system 900 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the methods (FIG. 4-6) and/or systems (FIGS. 1-3, 7, 8, and 10) described herein to facilitate wireless communication there between.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. A symbol modulator 915 multiplexes data and pilot symbols and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), or code division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the terminals. At terminal 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (i.e., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink, a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from terminal 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by terminal 930. A processor 990 performs channel estimation for each active terminal transmitting on the uplink. Multiple terminals may transmit pilot concurrently on the uplink on their respective assigned sets of pilot subbands, where the pilot subband sets may be interlaced.

Processors 990 and 950 direct (e.g., control, coordinate, manage, etc.) operation at access point 905 and terminal 930, respectively. Respective processors 990 and 950 can be associated with memory units (not shown) that store program codes and data. Processors 990 and 950 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure may be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor though various means as is known in the art.

Figure 10:
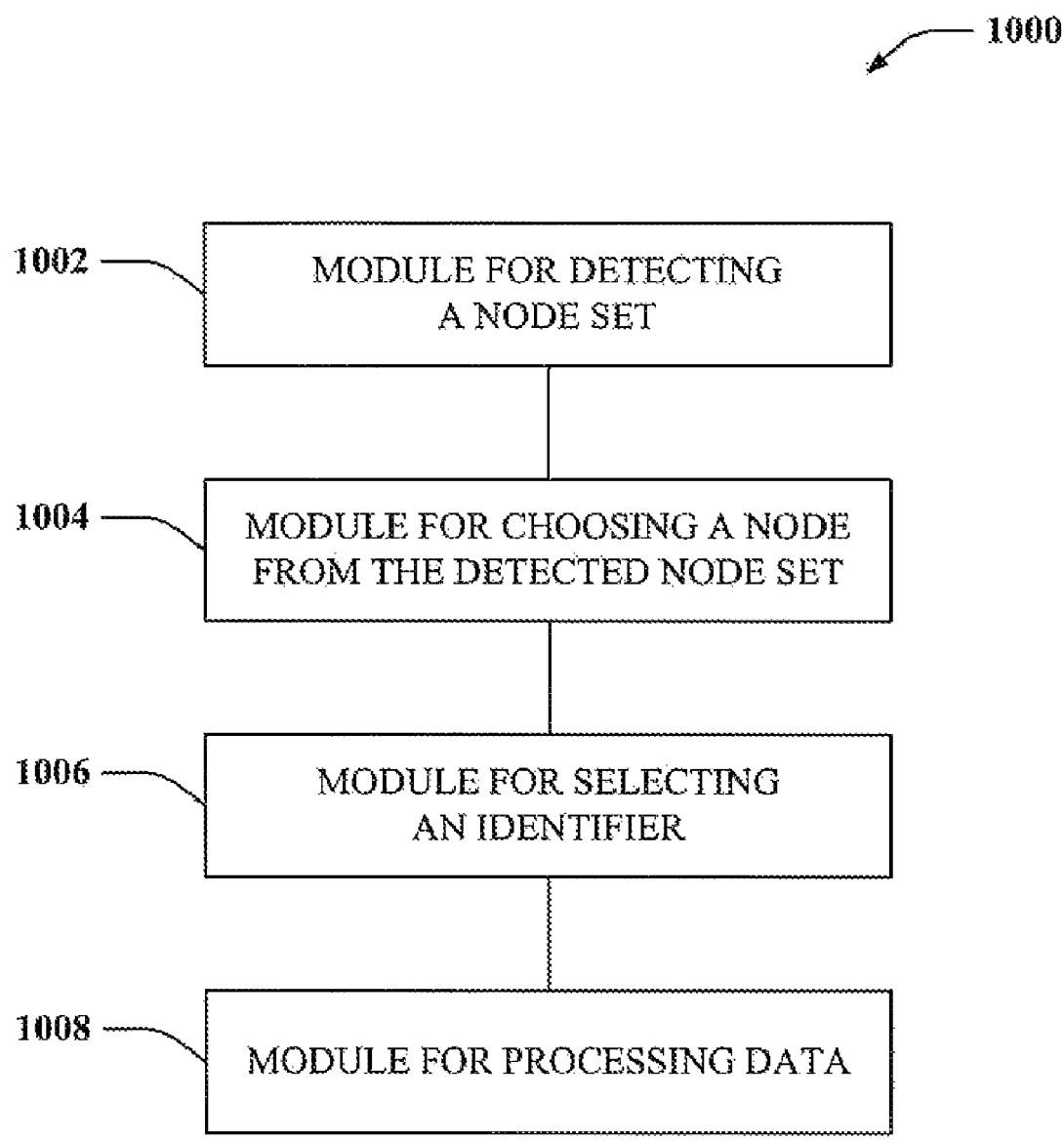
FIG. 10 is an illustration of an apparatus that facilitates controlling transmit and receive schedules for nodes in a time-division duplexing multi-hop mesh network, in accordance with one or more aspects.

FIG. 10 is an illustration of an apparatus 1000 that facilitates controlling transmit and receive schedules for nodes in a time-division duplexing multi-hop mesh network, in accordance with one or more aspects. Apparatus 1000 comprises a module for detecting a node set or node group 1002. The node set may comprise one or more nodes that are within a wireless communication environment in which the apparatus 1000 is employed.

Module for detecting a node set 1002 is operatively coupled to a module for choosing a node from the detected set 1004. An identifier may be associated with the chosen node and indicates time slots during which a given node may transmit and/or receive. Identifiers may comprise colors, numerical values, bit values, and so forth. The module for choosing a node from the detected set 1004 may choose the node by determining an identifier associated with each detected node and choosing the node based on the determined identifier. Thus, the node may be chosen based solely on the identifier without taking into consideration other factors, such as a communication link quality, transmission rate, and so on. The chosen node may be a wired access point, a wireless access point or an access terminal.

Operatively coupled to the module for choosing a node from the detected set 1004 is a module for selecting an identifier 1006. The identifier may be selected from a set that includes two or more identifiers, which may comprise the identifier of the chosen node and a selected identifier. According to another aspect, the set of identifiers may comprise a first identifier to be selected only by an access terminal and a second identifier to be selected by either an access terminal or an access point. A third identifier may also be included in the set that is to be selected only by an access point. As such, the access terminal may have two identifiers from which it can select and the access point may have one or two identifiers from which it can select. It will be appreciated that any suitable identifiers (e.g., colors numbers, letters, frequencies, . . . ) may be utilized to distinguish nodes from one another. If the apparatus 1000 is implemented in a wired access point, the module for selecting an identifier 1006 may randomly select the identifier from the set, or based on some other selection technique. As such, the access terminal may have two identifiers from which it can select and the access terminal may have one or two identifiers from with it can select. It will be appreciated that any suitable identifiers (e.g., colors numbers, letters, frequencies, . . . ) may be utilized to distinguish nodes from one another. If the apparatus 1000 is implemented in a wired access point, the module for selecting an identifier 1006 may randomly select the identifier from the set, or based on some other selection technique.

According to an aspect, module for selecting an identifier 1006 may select an identifier that is different from the identifier associated with the chosen node. The selection may be based on a transmit power of the apparatus, based on quality of service associated with the apparatus, or based on both the transmit power and the quality of service. Further, identifiers may be selected by multiple nodes (e.g., when employed in a network controller or the like) wherein nodes select identifiers such that proximate nodes (e.g., nodes next to each other topographically, geographically, etc.) select different identifiers. For instance, if a first node selects the color red, then nodes one hop away from the first node may select the color blue. Identifiers may be selected by remaining nodes so long as their neighboring nodes select different indicators. According to the above example, nodes that are two hops away from the first node may select the color red, while nodes that are three hops away may select blue. In this example, nodes that are an odd number of hops from the first node may select the second color, while nodes that are an even number of hops away from the first node may select the color of the first node. In this manner, no two neighboring nodes will select the same color, indicator, or identifier.

According to a related aspect, module for selecting an identifier 1006 may reside in a node, such as a wired access point, a wireless access point, an access terminal, etc. Module for selecting an identifier 1006 may select an identifier to the node in which it is employed such that the selected identifier is different than identifiers assigned to nodes that are proximate to the node in which apparatus 1000 is employed. For instance, if nodes one hop away from the current node exhibit a red indicator or identifier, then the current node may select a blue indicator to ensure that it does not transmit at the same time as the red nodes, thereby mitigating interference caused and/or experienced by the current node.

Module for selecting an identifier 1006 may be operatively coupled to a module for processing data 1008. Such data may be processed based on the selected identifier, the identifier of the chosen node, or both the selected identifier and the identifier of the chosen node. The module for processing data 1008 may process the data by transmitting or receiving the data based on the selected identifier, the identifier of the chosen mode, or both. The data transmission or data reception may be associated with the chosen node and may be control data or payload data (e.g., voice data). The data may be received or transmitted on corresponding time slots, which permits a node to transmit or receive during time slots associated with the respective identifiers. For instance, according to an example wherein colors are used as identifiers, blue nodes may transmit/receive during blue time slots and red nodes may transmit/receive during red time slots, where differently colored time slots are distinct in time and do not overlap, such as are described with regard to FIGS. 2 and 3. By permitting transmission/reception only during a correspondingly colored time slot, neighboring nodes need not transmit at the same time, thus mitigating interference there between. Thus, apparatus 1000 facilitates controlling transmission and receive times for nodes in a TDD multi-hop mesh network in contrast to conventional systems, which in turn can facilitate mitigating receive chain saturation during transmission at a given node.

In accordance with some aspects, apparatus 1000 may also comprise a module for determining a channel condition associated with each detected node (not shown). Such determination may be made by determining interference associated with each detected node. The interference determination may be based on identifiers of the detected nodes. In such aspects, the means for selecting an identifier may select the identifier based on the channel determination, the interference determination, or both the channel condition determination and the interference determination.

What has been described above includes examples of one or more aspects. It is, of course, not possible to describe every conceivable combination of components or methods for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for data communications by an access node comprising:
   detecting a set of at least one node;
   choosing a node from the detected set, wherein the chosen node has an identifier associated therewith;
   selecting an identifier from a set of at least two identifiers;
   processing data during a time based on at least one of the selected identifier and the identifier of the chosen node; and wherein the access node comprises a wired access point and further wherein the selection comprises randomly selecting an identifier from the set of at least two identifiers for the wired access point.

2. An apparatus for data communications comprising:
   a detecting unit configured to detect a set of at least one node; a choosing unit configured to choose a node from the detected set, wherein the chosen node has an identifier associated therewith; a selecting unit configured to select an identifier from a set of at least two identifiers; a processing unit configured to process data during a time based on at least one of the selected identifier and the identifier of the chosen node; wherein the apparatus is implemented in one of a wired access point, a wireless access point and an access terminal.

3. A computer program product for data communications comprising:
   a non-transitory computer-readable medium comprising codes for causing a computer to:
   detect a set of at least one node;
   choose a node from the detected set, wherein the chosen node has an identifier associated therewith;
   select an identifier from a set of at least two identifiers;
   process data during a time based on at least one of the selected identifier and the identifier of the chosen node and wherein an access node comprises a wired access point and further wherein the selection comprises randomly selecting an identifier from the set of at least two identifiers for the wired access point.

4. A wireless node, comprising: a detecting unit configured to detect a set of at least one node; a choosing unit configured to choose a node from the detected set, wherein the chosen node has an identifier associated therewith; a selecting unit configured to select an identifier from a set of at least two identifiers; a processing unit configured to process data received or for transmission via a wireless medium during a time based on at least one of the selected identifier and the identifier of the chosen node and wherein an access node comprises a wired access point and further wherein the selection comprises randomly selecting an identifier from the set of at least two identifiers for the wired access point.

* * * * *